Oct. 16, 1956 W. A. GIESEKE 2,767,351
ELECTRONIC CONTROL CIRCUIT
Filed April 11, 1952

Inventor.
Werner A. Gieseke.
By John W Darley
Attorney.

United States Patent Office 2,767,351
Patented Oct. 16, 1956

2,767,351
ELECTRONIC CONTROL CIRCUIT
Werner A. Gieseke, Danville, Ill.

Application April 11, 1952, Serial No. 281,923

4 Claims. (Cl. 315—171)

My invention relates to an electronic control circuit and more particularly to one which is activated by a small change in current in an associated load circuit.

One object of the invention is to provide a control circuit employing either a gaseous or a vacuum tube wherein the activation of the control circuit is achieved by an impulse due to current change in an associated load circuit which causes a subsequent change in the tube condition effecting operation of an associated relay.

A further object is to provide a control circuit which is characterized by a high degree of stability and an easier control on the operation of the tube with particular reference to the pull-in and drop-out current of the relay.

These and further objects of the invention will be set forth in the following specification, reference being had to the accompanying drawing, and the novel means by which said objects are effectuated will be definitely pointed out in the claims.

Figure 1:
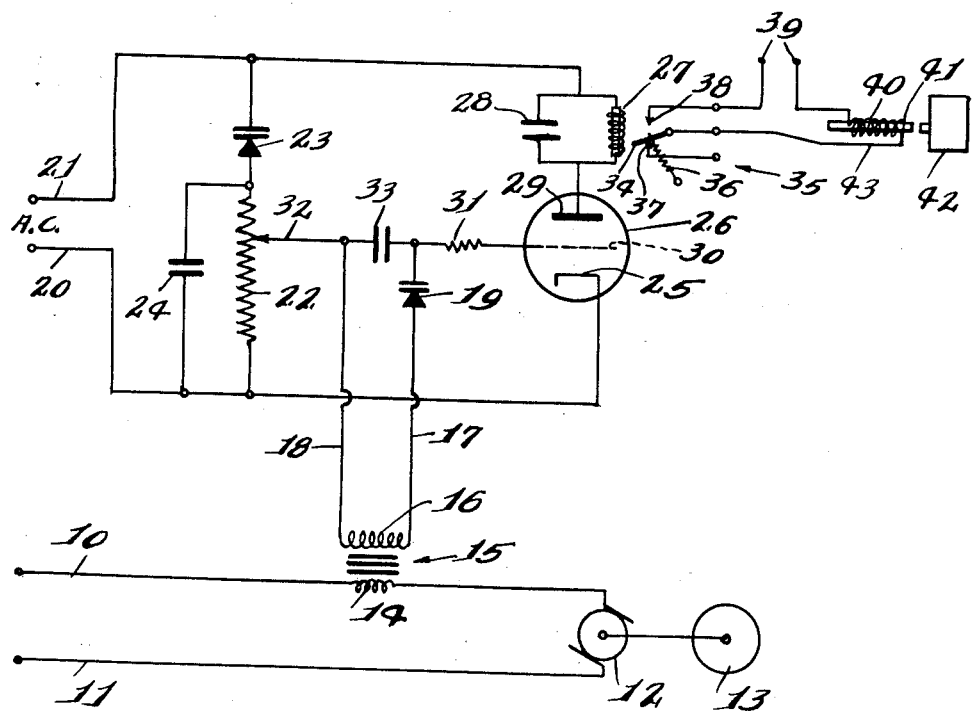
Fig. 1 illustrates a layout of the control circuit employing a vacuum tube in relation to a typical load circuit.

As illustrating a characteristic use of the control circuit and referring to Fig. 1 of the drawing, the same will be described in connection with a load circuit which includes a motor driven, upsetting machine for forming heads on rivets. The pieces to be formed into rivets are fed singly to the upsetting machine so that the head forming operation is repetitive. The forming of each head increases the mechanical load on the motor which is reflected in an increase in the current through the motor armature and this surge impulse is utilized by the control circuit to position a relay which determines the actuation of a mechanism that counts the rivets as formed.

Specifically, the load circuit includes wires 10 and 11 which are connected to an alternating source of power and to a motor 12 that is drivingly attached to a diagrammatically illustrated, upsetting machine generically indicated by the numeral 13 and which is intended to represent any type of load that is intermittently and temporarily increased, the periods between such increases being regular or irregular.

Included in the power wire 10 is the effective primary winding 14 of a transformer 15 from whose secondary winding 16 lead wires 17 and 18, the former wire including a selenium rectifier 19. The transformer 15 generically indicates an inductive coupling whereby surge impulses in the load circuit are applied to the control circuit.

In the control circuit, wires 20 and 21 are connected to an alternating source of power with voltage of the order of 115 volts. A series related resistor 22 and a selenium rectifier 23 are bridged between the wires 20 and 21 and bridged around the resistor 22 is a capacitor 24. The wire 20 connects with the cathode 25 of an electronic tube 26 which, in the present instance, is a triode of the vacuum type, while the power wire 21 connects through a time delay network including a parallel related relay coil 27 and a capacitor 28 with the plate 29.

The control grid 30 of the tube 26 connects through a current limiting resistor 31 with the wire 17 on the output side of the rectifier 19 and the wire 18 connects by a slider contact 32 in operable relation to the resistor 22 to provide a sensitivity control for the control circuit. A capacitor 33 is interposed between the wires 17 and 18 on the output side of the rectifier 19.

Under the assumed use of the control circuit with a rivet forming machine, the movable switch 34, forming in conjunction with the coil 27 a relay 35, is operably related to this coil and is normally held in the "off" position shown by a spring 36 against a dead contact or stop 37. The other or live contact 38 connects with a suitable source of electrical power 39 that in turn connects with one end of the coil of a solenoid 40 whose core 41 is actuatingly related to a counting mechanism generally indicated by the numeral 42. Hence, when the solenoid coil is energized as presently described, the shifting of the core 41 will effect operation of this mechanism. The other end of the solenoid coil connects by a wire 43 with the relay switch 34.

In describing the operation of the control circuit, it will be assumed that the load circuit is closed to thereby establish a "normal" alternating voltage across the secondary winding 16 of the transformer 15 as distinguished from the temporary increase in alternating voltage across the same winding during the rivet head forming operation.

Notwithstanding the use of an alternating voltage input to the control circuit, the rectifier 23 insures a voltage of unreversing polarity across the tube 26 and also across the resistor 22, with the capacitor 24 exercising a delay in the voltage decay across the resistor 22 so that the voltage across the tube remains more nearly constant. In other words, the resistor 22, rectifier 23 and capacitor 24 filter out the oscillations in the input voltage and present a steadier and unreversing voltage to the plate 29, as well as to that portion of the resistor 22 between the slider contact 32 and the power wire 20. It will be understood that the contact 32 is adjusted in relation to the normal voltage across the winding 16 and also in relation to the rectifier 19 which establishes a pulsating, unidirectional voltage across the capacitor 33 so that there is produced a steady, normal grid-to-cathode bias. The adjustment of this bias is such that the conductance of the tube is just less than that required to actuate the relay 35. The relay arm 34 is therefore in the open position under the pull of the spring 36.

During the forming of the rivet head, the accompanying increase in current through the armature of the motor 12 develops a corresponding alternating voltage increase across the transformer 15, but owing to the rectifier 19, the voltage across the capacitor 33 continues as a pulsating, unidirectional voltage and the increase therein drives the control grid more and only positive with respect to the normal bias. The tube is then fully conducting and plate current flowing through the coil 27 shifts the relay switch 34 into engagement with the contact 38, thus completing the circuit through the solenoid 40 which actuates the counting mechanism. The term "fully conducting" is used in the sense that, when subjected to the signal impulse, the tube conductance is sufficiently in excess of its normal or slight conductance to energize the relay.

During this phase of the operation, since the tube is alternately fully conducting or slightly conducting due to the pulsating voltage applied between its plate and cathode, the capacitor 28 charges when the tube is fully conducting and discharges while the tube is slightly conducting, thus holding the relay energized for a time sufficient to cause the operation of the counting mechanism. Capacitor 28 thus lengthens the time delay necessary to insure movement of the solenoid core and the actuation of the counting mechanism notwithstanding that the pulse through the tube may be of short duration.

Between the rivet head forming operations, the plateto-cathode voltage returns to normal and the tube is slightly conducting. The coil 27 is thus deenergized, the relay switch 34 returns to the "off" position, and the solenoid 40 is deenergized. The control circuit is then ready to receive the next impulse across the transformer and to count the next rivet.

As already noted, the use of the control circuit in connection with a counting mechanism is merely by way of example since the relay 35 or multiples thereof may be employed to control a variety of situations in accordance with the well known adaptabilities of relays. For example, the contacts 37 and 38 may be included in separate circuits which are respectively closed and opened while the tube is slightly conducting and opened and closed while the tube is fully conducting, or in the arrangement actually shown in the drawing, the spring 36 may be located to hold the relay switch 34 in a circuit closing position while the tube is slightly conducting, with the switch moving to an open position when the tube is fully conducting, or several relays may be used to control a like number of circuits.

From the foregoing, it will be apparent that, since a more constant or steadier voltage is applied to the plate of the tube and a more constant or steadier "normal" bias voltage is applied to the grid of the tube, the operation of the tube is more easily controlled. It is possible to adjust the bias of the tube so that the plate current is just less than the pull-in current of the relay and still obtain stable operation. With the relay more sensitive, its reaction to a sudden increase in plate current due to a sudden change in grid bias by reason of the signal impulse from the load circuit can be better predicted and more easily and accurately pre-set.

Figure 2:
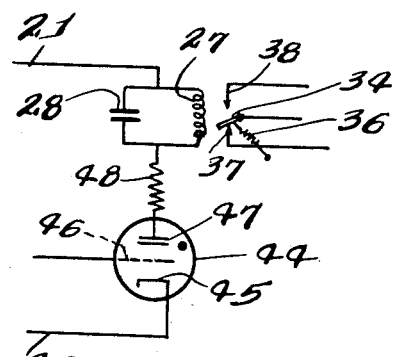
Fig. 2 is a fragmentary view of the control circuit modified to employ a gas filled tube.

In Fig. 2 is illustrated a modification of the control circuit which permits the use of a gas filled tube while retaining the above operating characteristics. The numeral 44 designates the gas filled tube having a cathode 45 and a grid 46 which are connected to the remainder of the control circuit as shown in Fig. 1. Between the plate 47 and the network including the relay coil 27 and capacitor 28 is interposed a resistor 48.

The grid bias is adjusted so that the tube 44 is normally deionized, i. e., during periods when a signal impulse is not received from the load circuit. When such a signal is received, the grid is driven positive and the tube 44 ionizes to thereby establish a substantial electron flow from the cathode 45 to the plate 47. This electron flow through the resistor 48 results in a voltage drop thereacross such that the plate voltage is lower than it had been by the amount of voltage drop across the resistor 48. The electron flow through this resistor, while it is reducing the plate voltage, is also energizing the coil 27 sufficient to actuate the relay 35. When the voltage drop across the resistor 48 is sufficient, the plate voltage decreases to a point where the tube deionizes, but the actuation of the relay will continue as deionization occurs.

I claim:

1. An electronic control circuit comprising a source of alternating current, means connected in series across the source including electronic tube means having a cathode, a control grid and a plate and an inductor-capacitor time delay network connected with the plate, sensitivity control means connected across the source for applying a substantially constant and unreversing voltage to the plate and grid including in series a resistor having its input end connected to the cathode and a selenium rectifier whose output side connects with the output side of the network and a first capacitor bridged around the resistor, a slider contact and a second capacitor interposed between the slider contact and the grid, the position of the contact determining the initial bias of the grid, and means for changing the initial bias of the grid including an inductive coupling having a primary intermittently subjected to a voltage in excess of a constant voltage and a series related secondary and selenium rectifier connected to opposite sides of the second capacitor whereby an impulse due to an excess voltage across the secondary is applied to the grid.

2. An electronic control circuit comprising a source of alternating current, means connected in series across the source including a vacuum tube having a cathode, a control grid and a plate and an inductor-capacitor time delay network connected with the plate, sensitivity control means connected across the source for applying a substantially constant and unreversing voltage to the plate and grid including in series a resistor having its input end connected to the cathode and a selenium rectifier whose output side connects with the output side of the network and a first capacitor bridged around the resistor, means for adjusting the initial bias of the grid to render the tube relatively slightly conducting including a slider contact operably related to the sensitivity control resistor and a second capacitor interposed between the slider contact and the grid, and means for changing the initial bias to make the tube relatively fully conducting including an inductive coupling having a primary intermittently subjected to a voltage in excess of a constant voltage and a series related secondary and selenium rectifier connected to opposite sides of the second capaitor whereby an impulse due to an excess voltage across the secondary is applied to the grid.

3. An electronic control circuit comprising a source of alternating current, means connected in series across the source including a gas filled tube having a cathode, a control grid and a plate, an inductor-capacitor time delay network and a resistor interposed between the plate and network, sensitivity control means connected across the source for applying a substantially constant and unreversing voltage to the plate and grid including in series a resistor having its input end connected to the cathode and a selenium rectifier whose output side connects with the output side of the network and a first capacitor bridged around the resistor, means for adjusting the initial bias of the grid to deionize the tube including a slider contact operably related to the sensitivity control resistor and a second capacitor interposed between the slider contact and the grid, and means for changing the initial bias to ionize the tube including an inductive coupling having a primary intermittently subjected to a voltage in excess of a constant voltage and a series related secondary and selenium rectifier connected to opposite sides of the second capacitor whereby an impulse due to an excess voltage across the secondary is applied to the grid.

4. An electronic control circuit comprising a source of alternating current, means connected in series across the source including electronic tube means having a cathode, a control gird and a plate and an inductor-capacitor time delay network connected with the plate, sensitivity control means connected across the source for applying a substantially constant and unreversing voltage to the plate and grid including in series a resistor having input end connected to the cathode and a rectifying device whose output side connects with the output side of the network and a first capacitor bridged around the resistor, a slider contact and a second capacitor interposed between the slider contact and the grid, the position of the contact determining the initial bias of the grid, and means for changing the initial bias of the grid including an inductive coupling having a primary intermittently subjected to a voltage in excess of a constant voltage and a series related secondary and rectifying device connected to opposite sides of the second capacitor whereby an impulse due to an excess voltage across the secondary is applied to the grid.

References Cited in the file of this patent

UNITED STATES PATENTS

| | | |
|---|---|---|
| 2,169,023 | Dawson | Aug. 8, 1939 |
| 2,174,386 | King | Sept. 26, 1939 |
| 2,415,963 | Olving | Feb. 18, 1947 |
| 2,463,318 | Schneider | Mar. 1, 1949 |